(12) United States Patent
Larsen

(10) Patent No.: US 8,780,595 B2
(45) Date of Patent: Jul. 15, 2014

(54) METHODS AND SYSTEMS FOR CONTROLLING A POWER CONVERTER

(75) Inventor: Einar Vaughn Larsen, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 13/323,261

(22) Filed: Dec. 12, 2011

(65) Prior Publication Data

US 2013/0148393 A1 Jun. 13, 2013

(51) Int. Cl.
*F21V 33/00* (2006.01)
(52) U.S. Cl.
USPC ............... 363/121; 363/39; 363/40; 363/41
(58) Field of Classification Search
USPC ............ 363/39, 40, 41, 51, 55, 95, 121
See application file for complete search history.

(56) References Cited

U.S. PATENT DOCUMENTS

| | | | | |
|---|---|---|---|---|
| 4,800,478 | A | * | 1/1989 | Takahashi ................... 363/41 |
| 7,855,539 | B1 | | 12/2010 | Wong et al. |
| 2008/0205096 | A1 | * | 8/2008 | Lai et al. .................... 363/40 |
| 2011/0199072 | A1 | | 8/2011 | Kerkman et al. |
| 2013/0027993 | A1 | * | 1/2013 | Tan et al. .................... 363/40 |

* cited by examiner

*Primary Examiner* — Nguyen Tran
(74) *Attorney, Agent, or Firm* — James McGinness; Armstrong Teasdale LLP

(57) ABSTRACT

A controller for controlling a power converter is described. The controller includes an input configured to receive at least one grid feedback signal, a filter, and an output. The filter is configured to receive the at least one grid feedback signal and generate an output signal that does not deviate by more than a predefined amount from the at least one grid feedback signal. The output is configured to provide a voltage command signal to the power converter that is based at least partially on the output signal.

16 Claims, 4 Drawing Sheets

METHODS AND SYSTEMS FOR CONTROLLING A POWER CONVERTER

BACKGROUND OF THE INVENTION

The embodiments described herein relate generally to operating a power converter, and more specifically, to applying a nonlinear tracking filter within a current regulator of the power converter.

Light and wind are examples of renewable sources of energy that are increasingly becoming attractive alternative sources of energy. Solar energy in the form of sunlight may be converted to electrical energy by solar cells. A more general term for devices that convert light to electrical energy is "photovoltaic cells." Wind energy may be converted to electrical energy using a wind turbine generator. Wind turbine generators typically include a rotor having multiple blades that transform wind energy into rotational motion of a drive shaft, which in turn is utilized to drive an electric generator.

Power generated by an electric utility, using renewable sources of energy or fossil fuel based sources of energy, is typically delivered to a customer over an electrical grid. Electricity applied to the electrical grid is required to meet grid connectivity expectations. These requirements address safety issues as well as power quality concerns. For example, the grid connectivity expectations include operating the power generation system during a transient event, also referred to herein as a grid fault event. This capability may be referred to as low voltage ride through (LVRT) or zero voltage ride through (ZVRT). An LVRT/ZVRT event is a condition where the alternating current (AC) utility voltage is low on either one phase of the electrical grid or multiple phases of the electrical grid. During an LVRT/ZVRT event, the capacity of the electrical grid to accept power from the power generation system is low, a condition also referred to herein as a "weak grid".

To avoid adverse interaction between the converter and the electrical grid, the bandwidth of a current regulator included within known power converters is reduced. For example, known power converters include a current regulator that utilizes low-pass filtering to avoid adverse interaction between the converter and the electrical grid. The low-pass filtering may prevent high-frequency grid resonances affecting the electrical grid. However, the low-pass filtering (i.e., reduced bandwidth of the current regulator) slows the response of the converter and causes delays in a converter response to a grid fault event.

A slow response to a grid fault event may prevent the power converter from riding through the grid fault event. The power converter must rapidly respond to a grid fault event to ride through a low voltage or a zero voltage grid condition. More specifically, if the power converter does not respond quickly to the grid fault event, the voltages and/or currents at an output of the power converter may exceed protective thresholds. Exceeding the protective thresholds may cause the converter to trip, which prevents the converter from riding through the grid fault event.

BRIEF DESCRIPTION OF THE INVENTION

In one aspect, a controller for controlling a power converter is provided. The controller includes an input configured to receive at least one grid feedback signal, a filter, and an output. The filter is configured to receive the at least one grid feedback signal and generate an output signal that does not deviate by more than a predefined amount from the at least one grid feedback signal. The output is configured to provide a voltage command signal to the power converter that is based at least partially on the output signal.

In another aspect, a method for controlling a power converter using a power converter controller is provided. The method includes receiving a grid voltage feedback signal associated with at least one grid measurement. The method also includes filtering the grid voltage feedback signal through a filter configured to generate an output signal that does not deviate by more than a predefined amount from the at least one grid voltage feedback signal. The method also includes generating a feedforward voltage signal based on the output signal and generating a voltage command signal based at least partially on the feedforward voltage signal.

DETAILED DESCRIPTION OF THE INVENTION

The methods and apparatus described herein facilitate rapid response of a power converter to a grid fault event while reducing adverse interaction between the power converter and an electrical grid. More specifically, a current regulator within the power converter utilizes a nonlinear tracking filter to provide low-pass filtering of a grid voltage feedback signal when the measured grid voltage associated with the grid voltage feedback signal is within a predefined range of a steady-state value. Furthermore, the nonlinear tracking filter applies a nonlinear forcing when the output of the filter deviates significantly from the grid feedback voltage.

Technical effects of the methods and apparatus described herein include at least one of: (a) receiving a grid voltage feedback signal associated with at least one grid measurement; (b) filtering the grid voltage feedback signal through a filter configured to generate an output signal that does not deviate by more than a predefined amount from the at least one grid voltage feedback signal; (c) generating a feedforward voltage signal based on the filtered signal; and, (d) generating a voltage command signal based at least partially on the feedforward voltage signal.

Figure 1:
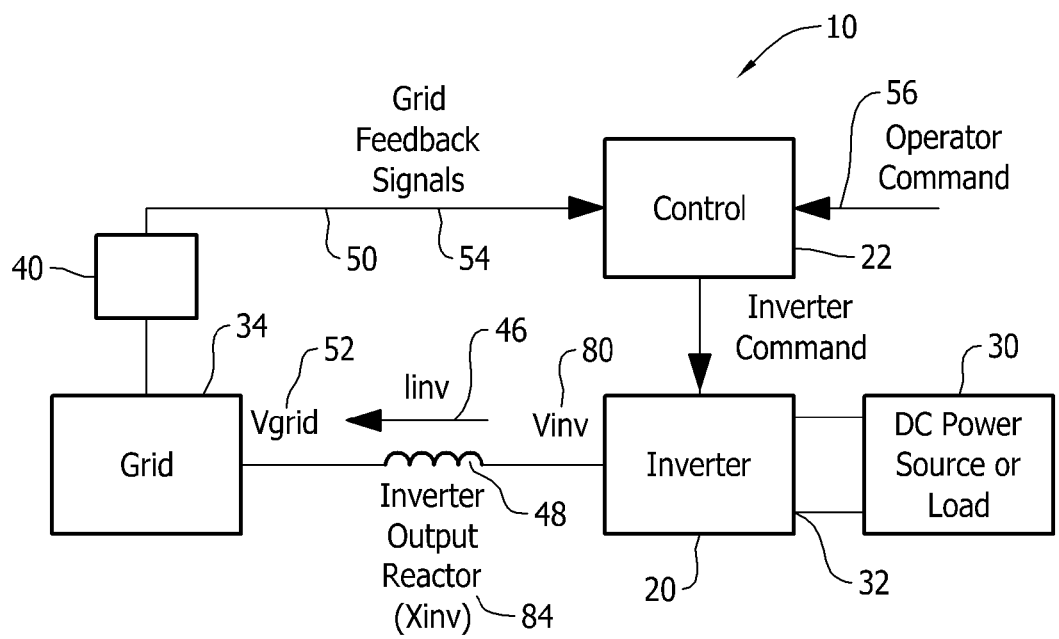
FIG. 1 is a block diagram of a power conversion system that includes a power converter and a converter controller.

FIG. 1 is a block diagram of a power conversion system 10 that includes a power converter 20 and a converter controller 22. In the exemplary embodiment, power converter 20 includes a direct current (DC) to alternating current (AC) inverter. In the exemplary embodiment, a DC power source 30 provides power to an input 32 of power converter 20. Power converter 20 is controlled by converter controller 22 and provides power to an electrical grid 34. As referred to herein, electrical grid 34 is a network of conductors and devices configured for distribution and/or transmission of electricity.

In the exemplary embodiment, DC power source 30 includes a photovoltaic (PV) array. Power converter 20 receives a DC voltage output by the PV array and converts it to a three-phase AC output that is applied to a load, for example, electrical grid 34. In an alternative embodiment, DC power source 30 includes a wind turbine that includes, or is coupled to, an AC to DC converter (not shown in FIG. 1). The wind turbine converts wind energy to a variable frequency AC power which is provided to the AC to DC converter. The AC to DC converter converts the AC power to a DC power which is provided to input 32 of power converter 20. Although described in the context of solar energy and wind energy, power source 30 may be any suitable type of power source.

In the exemplary embodiment, power conversion system 10 includes at least one measurement device 40. For example, the at least one measurement device 40 may include a grid current measurement device and/or a grid voltage measurement device. In the exemplary embodiment, measurement device 40 measures a current (Iinv) 46 through a reactor 48 coupled between power converter 20 and electrical grid 34 and generates a corresponding grid current feedback signal (Ifbk) 50. Measurement device 40 also measures a grid voltage (Vgrid) 52 and generates a corresponding grid voltage feedback signal (Vgrid_fbk) 54. Measurement device 40 provides grid current feedback signal 50 and grid voltage feedback signal 54 to controller 22.

Moreover, in the exemplary embodiment, converter controller 22 receives an operator command, for example, a current command signal (Icmd) 56 from a user. Current command signal 56 may be stored in a memory device (not shown in FIG. 1), provided to converter controller 22 via an input device (not shown in FIG. 1), or provided to converter controller 22 in any other suitable manner that allows power conversion system 10 to function as described herein. Current command signal 56 defines a desired level for current 46 when power conversion system 10 is operated in a current regulating mode.

Figure 2:
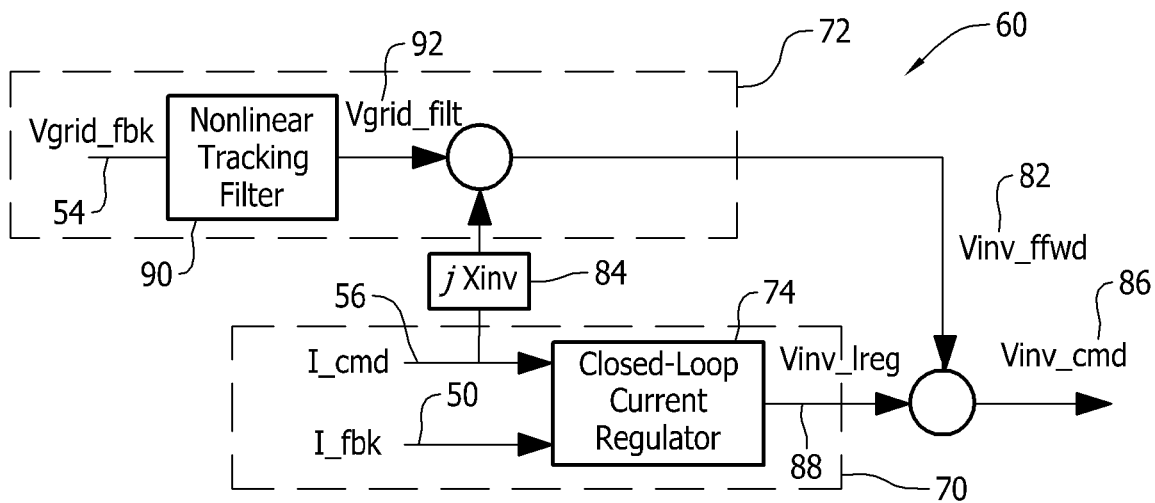
FIG. 2 is a control diagram representing operation of a current regulator system used to control the power converter shown in FIG. 1.

FIG. 2 is a control diagram representing operation of a current regulator system 60 used to control power converter 20 (shown in FIG. 1). In the exemplary embodiment, a controller, for example, but not limited to, converter controller 22 (shown in FIG. 1), is programmed to perform the functions of current regulator system 60. However, in alternative embodiments, the functions of current regulator system 60 may be performed by any circuitry configured to allow power conversion system 10 (shown in FIG. 1) to function as described herein.

In the exemplary embodiment, power conversion system 10 includes grid fault ride through capabilities. More specifically, current regulator system 60 facilitates identifying an occurrence of a grid fault event and providing power converter 20 with signals that facilitate low voltage ride through (LVRT) and/or zero voltage ride through (ZVRT).

A grid fault event may leave electrical grid 34 in a degraded mode where the grid impedance is too high to accommodate power provided by power conversion system 10. An example of a grid fault event includes a short-circuit fault on one of the transmission lines within electrical grid 34. Electrical transmission protection actions remove the faulted portion of electrical grid 34 to permit operation of the remaining unfaulted portion of electrical grid 34. A transmission path remains that is degraded in its ability to transmit power. Such grid fault events cause a brief period of low voltage on electrical grid 34 prior to clearing the faulted portion of the electrical grid 34.

Typically, a terminal voltage will approach zero volts at the time of the grid fault event. Often, a low voltage transient and/or a zero voltage transient will cause a generator trip and associated consequences to the semiconductor devices (e.g., potential damage to components of DC power source 30 and/or power converter 20). System 10 facilitates low voltage ride through capability (LVRT) as well as zero voltage ride through (ZVRT) capability for system 10 such that a potential for a trip and associated consequences to the semiconductor devices are mitigated during low voltage transients and/or zero voltage transients.

In the exemplary embodiment, current regulator system 60 includes a current regulator corrector path 70 and a current regulator predictor path 72. Corrector path 70 includes a closed-loop current regulator 74. Closed-loop current regulator 74 receives current command signal (Icmd) 56 and grid current feedback signal (Ifbk) 50. Current command signal 56 is compared to grid current feedback signal 50 to determine a voltage command signal for power converter 20 to implement. For example, closed-loop current regulator 74 may integrate an error between current command signal 56 and grid current feedback signal 50 to create the voltage command signal for power converter 20 to implement.

In the exemplary embodiment, predictor path 72 receives grid voltage feedback signal 54 and current command signal 56 and predicts what an output voltage 80 (shown in FIG. 1) of power converter 20 needs to be to support the current through reactor 48 (shown in FIG. 1) associated with current command signal 56. The output voltage predicted to support the desired current is referred to herein as a feedforward voltage, represented in FIG. 2 as a feedforward voltage signal (Vinv_ffwd) 82. Feedforward voltage signal 82 is also dependent upon the known reactance (Xinv) 84 (shown in FIG. 1) between power converter 20 and electrical grid 34. In the exemplary embodiment, output voltage 80 associated with feedforward voltage signal 82 equals grid voltage 52 plus the product of current command signal 56 and an impedance of reactor 48 (jXinv). Predictor path 72 may utilize a cross-axis implementation to generate feedforward voltage signal 82. In some embodiments, predictor path 72 may also utilize current feedback signal 50 and current command signal 56 to generate feedforward voltage signal 82.

Furthermore, current regulator system 60 generates a voltage command signal 86 based at least partially on feedforward voltage signal 82 and an output 88 of closed-loop current regulator 74. Power converter 20 receives voltage command signal 86 from controller 22 and operates in accordance with voltage command signal 86.

In the exemplary embodiment, predictor path 72 includes a filter 90. For example, filter 90 may be referred to as a non-linear tracking filter. Grid voltage feedback signal 54 is provided to filter 90. Filter 90 processes grid voltage feedback signal 54 and outputs an output voltage signal 92. In the exemplary embodiment, the output voltage signal 92 is not always linearly related to grid voltage feedback signal 54. For example, filter 90 may include a deadband. When grid voltage feedback signal 54 is within the deadband, filter 90 exhibits a slow, low-pass filtering characteristic. When grid voltage feedback signal 54 is outside of the deadband, output voltage signal 92 will be forced to remain within a predefined range of grid voltage feedback signal 54.

Figure 3:
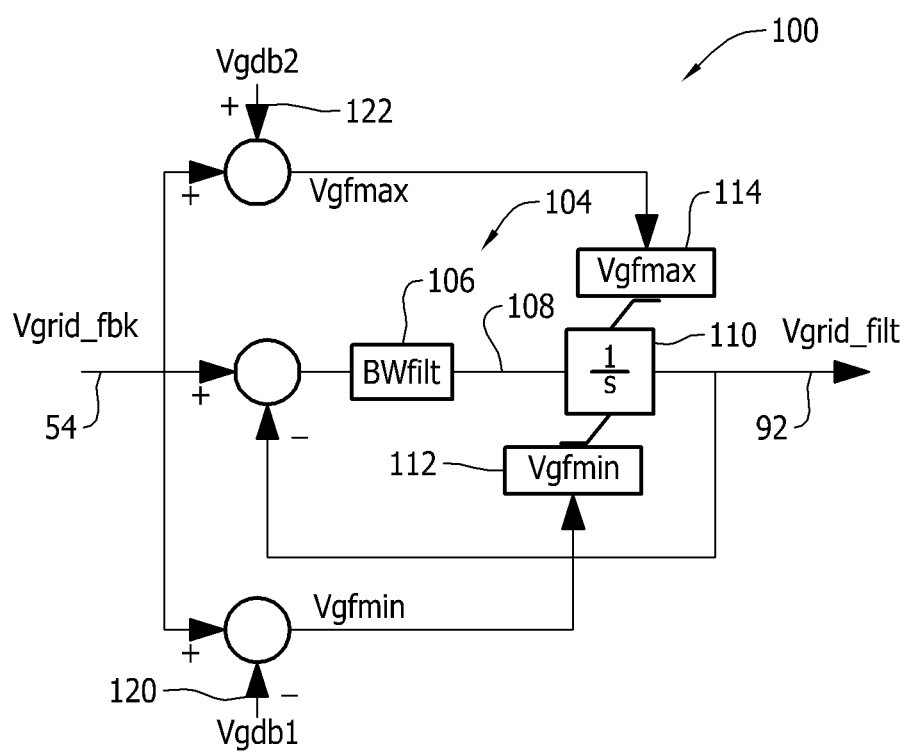
FIG. 3 is a control diagram representing operation of a nonlinear tracking filter utilized by the current regulator system shown in FIG. 2.

FIG. 3 is an exemplary control diagram 100 representing operation of filter 90 (shown in FIG. 2). Filter 90 is included in predictor path 72 of current regulator system 60 (both shown in FIG. 2). Control diagram 100 is provided as an example only and any other suitable implementations of a nonlinear tracking filter may be included within current regulator system 60 that allow power conversion system 10 to function as described herein.

In the exemplary embodiment, filter 90 prevents output voltage signal 92 from deviating by more than a predefined amount from grid voltage feedback signal 54. More specifically, filter 90 prevents a voltage value associated with output voltage signal 92 from deviating by more than a predefined amount from a voltage value associated with grid voltage feedback signal 54 (i.e., the non-filtered value).

In the exemplary embodiment, filter 90 includes a low-pass filter 104 that receives and filters grid voltage feedback signal 54 and outputs output voltage signal 92. In the exemplary embodiment, low-pass filter 90 includes a linear portion comprising an integrator 110 that receives an input 108 that is a gain 106 times the difference between received voltage signal 54 and output voltage signal 92. This structure is known in the art as a first-order linear filter. In the exemplary embodiment, this linear portion may have a bandwidth of approximately 30 r/s.

In the exemplary embodiment, filter 90 also includes nonlinear elements comprising non-windup limits on integrator portion 110. More specifically, integrator portion 110 includes a minimum non-windup limit (Vgfmin) 112 and a maximum non-windup limit (Vgfmax) 114. For example, minimum non-windup limit 112 may be derived by offsetting grid voltage feedback signal 54 by a first predefined value 120 (e.g., Vgdb1). Maximum non-windup limit 114 may be derived by offsetting grid voltage feedback signal 54 by a second predefined value 122 (e.g., Vgbd2). Non-windup limits 112 and 114 enforce the constraint that output voltage signal 92 remain within a desired range around grid voltage feedback signal 54.

For example, if filtered voltage signal 92 is less than a predefined tolerance from grid voltage feedback signal 54, filter 90 exhibits a slow, low-pass filtering characteristic and output voltage signal 92 is a low-pass filtered signal. More specifically, if filtered voltage signal 92 is within a voltage range between Vgrid_fbk 54+Vgdb2 and Vgrid_fbk 54−Vgdb1, (i.e., filtered voltage signal 92 is within the deadband), output voltage signal 92 of integrator portion 110 will be equal to the linearly filtered value of measured grid voltage signal 54. When electrical grid 34 is operating in a steady state condition (i.e., is not experiencing a grid fault event), filtered voltage signal 92 typically will be within the deadband and low-pass filtering of grid voltage feedback signal 54 is desired, for example, to reduce grid issues caused by high-frequency grid resonance.

However, if output voltage signal 92 is more than the predefined tolerance from grid voltage feedback signal 54, output voltage signal 92 is forced to remain within a predefined range of grid voltage feedback signal 54. For example, if filtered voltage signal 92 is not within the voltage range between Vgrid_fbk 54+Vgdb2 and Vgrid_fbk 54−Vgdb1 (i.e., is outside of the deadband), integrator portion 110 operates such that output voltage signal 92 rapidly follows the corresponding limit. More specifically, if output voltage signal 92 is higher than Vgrid_fbk 54+Vgdb2, integrator portion 110 operates such that output voltage signal 92 follows maximum non-windup limit 114. If output voltage signal 92 is lower than Vgrid_fbk 54−Vgdb1, integrator portion 110 operates such that output voltage signal 92 follows minimum non-windup limit 112. Integrator portion 110 will maintain output voltage signal 92 within a predefined range of grid voltage feedback signal 54 until the difference between grid voltage feedback signal 54 and filtered voltage signal 92 is once again within the predefined tolerance.

When electrical grid 34 is experiencing a major disturbance (e.g., a grid fault event), grid voltage feedback signal 54 will rapidly change, for example, rapidly decrease to approximately zero volts. Grid voltage feedback signal 54 may remain at approximately zero volts for a short time, for example, one-hundred milliseconds. Filtered voltage signal 92 will decrease less rapidly, creating a growing difference between grid voltage feedback signal 54 and filtered voltage signal 92. Maintaining output voltage signal 92 within a tolerance of grid voltage feedback signal 54 causes current 46 (shown in FIG. 1) to more accurately track current command signal 56 (shown in FIG. 1 and FIG. 2) during a grid fault event, by virtue of the quicker action of feedforward path 72 (shown in FIG. 2) compared to the integration of current error in current regulator corrector path 70 (shown in FIG. 2).

The predefined tolerance for output voltage signal 92 is, for example, within a range of 5% to 15% above or below grid voltage feedback signal 54, and more specifically, approximately 10% above or below grid voltage feedback signal 54. In other words, Vgdb1 120 may be defined as 10% less than Vgrid_fbk 54 and Vgdb2 122 may be defined as 10% more than Vgrid_fbk 54. Vgdb1 120 may be equal to Vgdb2 122, or Vgdb1 120 may be different than Vgbd2 122. Values for Vgdb1 120 and Vgdb2 122 may be established as part of a tuning process for power regulator system 60. Furthermore, when output voltage signal 92 is within the predefined tolerance, filter 90 may include a filter bandwidth of approximately 30 r/s.

Figure 4:
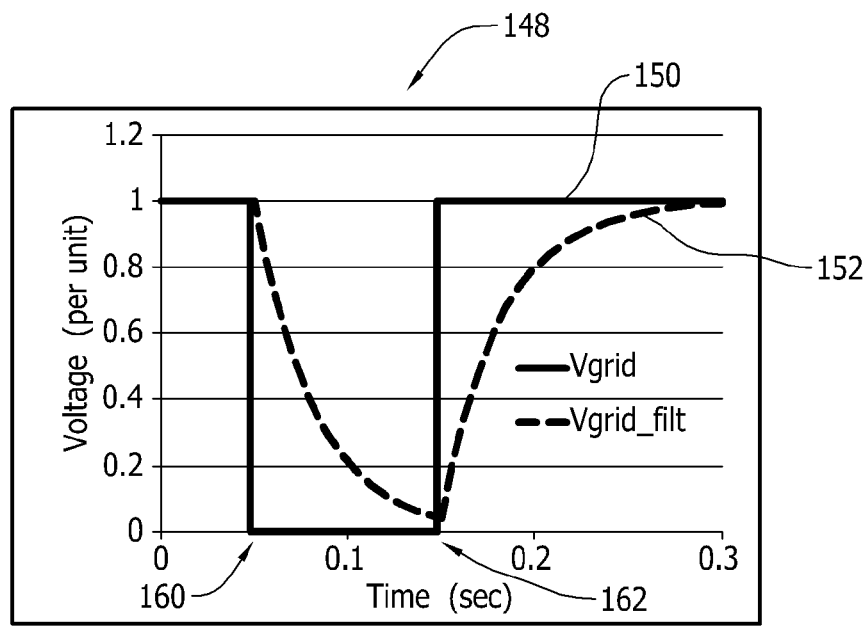
FIG. 4 is a chart of a simulated grid voltage and filtered grid voltage during a grid fault event obtained using a known tracking filter.

FIG. 4 is a chart 148 of a simulated grid voltage 150 measured during a grid fault event and a corresponding filtered grid voltage 152 output by a known low-pass filter. At a first point in time 160, for example, approximately 0.05 seconds, grid voltage 150 rapidly drops to approximately zero volts, for example, drops to approximately zero volts in substantially zero time. A grid fault event causes this drop in grid voltage. When the grid fault event is cleared, grid voltage 150 rapidly returns to a pre-fault level at second point in time 162. A delay introduced by the known low-pass filter causes filtered grid voltage 152 to lag behind grid voltage 150. For example, at first point in time 160, grid voltage 150 is reduced to approximately zero volts more rapidly than filtered grid voltage 152. Similarly, grid voltage 150 increases to the pre-fault level more rapidly than filtered grid voltage 152.

Figure 5:
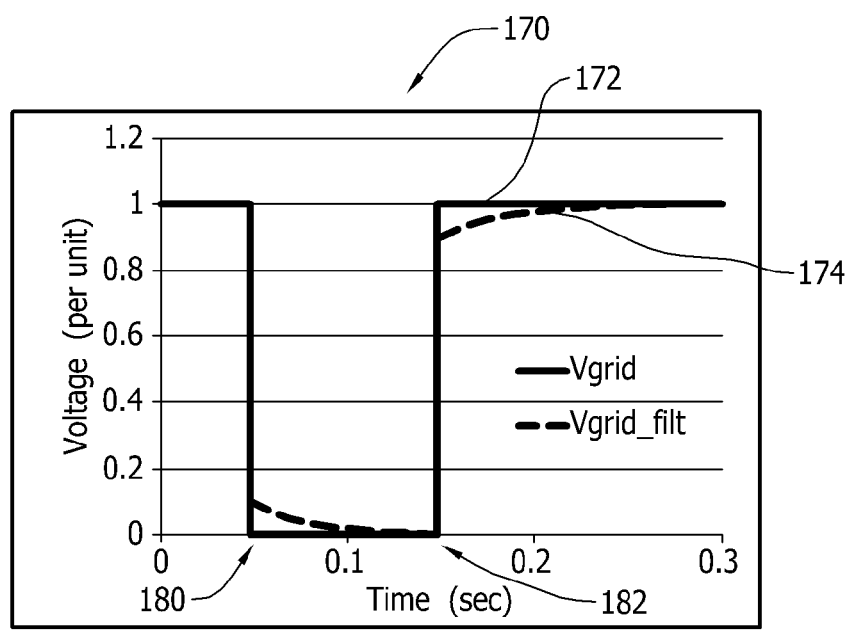
FIG. 5 is a chart of a simulated grid voltage and filtered grid voltage during a grid fault event obtained using a nonlinear tracking filter.

FIG. 5 is a chart 170 of a simulated grid voltage 172 measured during a grid fault event and a corresponding filtered grid voltage 174 output by a nonlinear tracking filter, for example, filter 90 (shown in FIG. 3). In the exemplary embodiment, from the start of the simulation to a first point in time 180, electric grid 34 is operating in a steady state condition prior to a grid fault event that occurs at first point in time 180. Prior to first point in time 180, filter 90 provides low-pass filtering to the grid voltage signal. The nonlinear action of tracking filter 90 occurs at first point in time 180. Filter 90 outputs a filtered grid voltage 174 that substantially follows simulated grid voltage 172. Similarly, once the grid fault condition is cleared, for example, at a second point in time 182, filtered grid voltage 174 substantially follows simulated grid voltage 172. The difference between filtered grid voltage 174 and simulated grid voltage 172 is compensated to prevent current 46 (shown in FIG. 1) from deviating more than a predefined amount from current command 56 (shown in FIG. 1).

Figure 6:
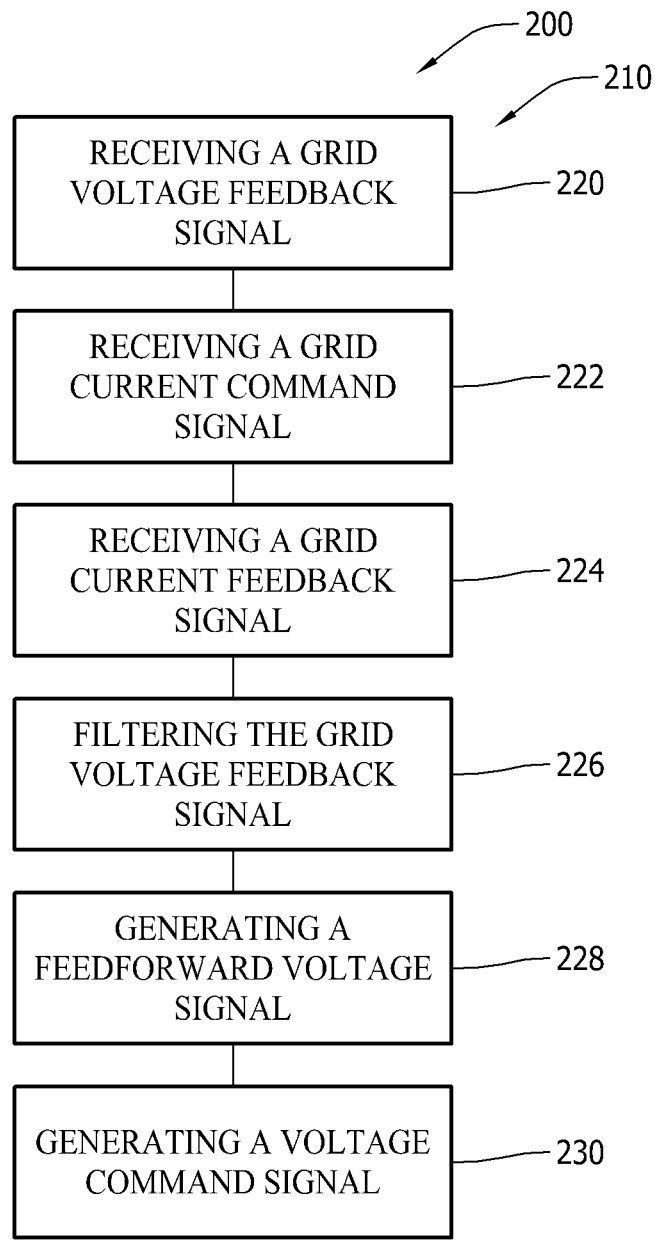
FIG. 6 is a flow chart of a method for controlling a power converter using the power converter controller shown in FIG. 1.

FIG. 6 is a flow chart 200 of a method 210 for controlling a power converter, for example, power converter 20 (shown in FIG. 1). In the exemplary embodiment, a controller, for example, controller 22 performs the following method to minimize a difference between a power converter output current, for example, current 46 (shown in FIG. 1) and a command current, for example, command current 56 (shown in FIG. 1).

In the exemplary embodiment, method 210 includes receiving 220 a grid voltage feedback signal, for example, grid voltage feedback signal 54 (shown in FIG. 1), associated with at least one grid measurement. Converter controller 22 may receive 220 grid voltage feedback signal 54 from a measurement device, for example, measurement device 40 (shown in FIG. 1). Method 210 may also include receiving 222 a grid current command signal, for example, grid current command signal 56 (shown in FIG. 1) and receiving 224 a grid current feedback signal, for example, grid current feedback signal 50 (shown in FIG. 1), associated with at least one grid measurement (e.g., current 46, shown in FIG. 1). In the exemplary embodiment, a current regulator system, for example, current regulator system 60 (shown in FIG. 2) receives grid voltage feedback signal 54, grid current command signal 56, and grid current feedback signal 50.

In the exemplary embodiment, method 210 also includes filtering 226 grid voltage feedback signal 54 through a nonlinear tracking filter, for example, nonlinear tracking filter 90 (shown in FIG. 2). As described above, filter 90 outputs a filtered signal, for example, filtered voltage signal 92, that does not deviate by more than a predefined amount from grid voltage feedback signal 54. For example, to filter 226 grid voltage feedback signal 54, filter 90 may apply an integrator that includes a first voltage limit and a second voltage limit to grid voltage feedback signal 54. Furthermore, filtering 226 grid voltage feedback signal 54 may include applying a slow filter bandwidth to grid voltage feedback signal 54 when the difference between filtered voltage signal 92 and grid voltage feedback signal 54 is less than the predefined amount. The slow filter bandwidth reduces grid issues caused by high-frequency grid resonance.

In the exemplary embodiment, method 210 also includes generating 228 a feedforward voltage signal, for example, feedforward voltage signal 82 (shown in FIG. 2), based on filtered voltage signal 92. For example, controller 22 may apply a feedforward function to filtered voltage signal 92 and grid current command signal 56 to generate 228 feedforward voltage signal 82. The feedforward function is configured to predict a converter output voltage that will cause the grid current to substantially equal a grid current associated with grid current command signal 56.

In the exemplary embodiment, method 210 also includes generating 230 a voltage command signal, for example, voltage command signal 86 (shown in FIG. 2), based at least partially on feedforward voltage signal 82.

Described herein are exemplary methods and apparatus for controlling operation of a power converter. The methods and apparatus described herein facilitate rapid response of a power converter to a grid fault event while preventing adverse interaction between the power converter and an electrical grid. More specifically, a current regulator within the power converter utilizes a nonlinear tracking filter to provide low-pass filtering of a grid voltage feedback signal when the measured grid voltage associated with the grid voltage feedback signal is within a predefined range of a steady-state value. Furthermore, the nonlinear tracking filter applies a nonlinear forcing when the output of the filter deviates significantly from the grid voltage.

The methods and apparatus described herein facilitate efficient and economical operation of a power converter. Exemplary embodiments of methods and apparatus are described and/or illustrated herein in detail. The methods and apparatus are not limited to the specific embodiments described herein, but rather, components of each apparatus, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller for controlling a power converter comprising:
    an input configured to receive at least one grid feedback signal;
    a filter configured to receive the at least one grid feedback signal and configured to apply a linear low-pass filter to the at least one grid feedback signal to generate an output signal that does not deviate by more than a predefined amount from the at least one grid feedback signal;
    integrator portion coupled to the filter and comprising a first voltage limit and a second voltage limit, wherein the first voltage limit is determined by offsetting the at least one grid feedback signal by a first predefined value, and wherein the second voltage limit is determined by offsetting the at least one grid feedback signal by a second predefined value; and,
    an output configured to provide a voltage command signal to the power converter that is based at least partially on the output signal.

2. A controller in accordance with claim 1, wherein the filter comprises a nonlinear tracking filter.

3. A controller in accordance with claim 1, wherein the predefined amount is from approximately 10% above the grid feedback signal and 10% below the grid feedback signal.

4. A controller in accordance with claim 1, wherein the output signal of the filter is substantially equal to the linearly filtered value of the grid feedback signal when the difference between the output signal and the grid feedback signal is less than the predefined amount.

5. A controller in accordance with claim 1, wherein the output signal of the filter is maintained within a predefined range of the grid feedback signal when the difference between the output signal and the grid feedback signal is greater than the predefined amount.

6. A controller in accordance with claim 1, wherein the power converter is an inverter configured to:
    receive direct current (DC) power from a DC power source;
    receive the voltage command signal from the controller;
    convert the DC power to an alternating current (AC) power in accordance with the voltage command signal; and,
    provide the AC power to an AC electrical grid.

7. A controller in accordance with claim 1, wherein the at least one grid feedback signal comprises at least one of a grid voltage feedback signal and a grid current feedback signal.

8. A controller in accordance with claim 1, wherein the input is further configured to receive a grid current command signal.

9. A controller in accordance with claim 8, further comprising a feedforward function configured to:
predict a converter output voltage that will cause the grid current to substantially equal a grid current associated with the grid current command signal; and,
generate a feedforward voltage signal based on at least one of the filtered signal, the grid current command signal, and the grid current feedback signal.

10. A power converter controller in accordance with claim 9, wherein the voltage command signal is based at least partially on the grid current feedback signal, the grid current command signal, and the feedforward voltage signal.

11. A method for controlling a power converter using a power converter controller, said method comprising:
receiving a grid voltage feedback signal associated with at least one grid measurement;
filtering the grid voltage feedback signal through a filter that includes a linear portion and a non-linear portion to the grid voltage feedback signal and configured to generate an output signal that does not deviate by more than a predefined amount from the at least one grid voltage feedback signal;
determining a first voltage limit by offsetting the at least one grid voltage feedback signal by a first predefined value;
determining a second voltage limit by offsetting the at least one grid voltage feedback signal by a second predefined value;
generating a feedforward voltage signal based on the output signal; and,
generating a voltage command signal based at least partially on the feedforward voltage signal.

12. A method in accordance with claim 11, wherein filtering the grid voltage feedback signal reduces high-frequency grid resonance.

13. A method in accordance with claim 11, further comprising:
receiving a grid current command signal;
receiving a grid current feedback signal associated with at least one grid measurement; and,
wherein generating a feedforward voltage signal further comprises applying a feedforward function to the output signal and the grid current command signal, wherein the feedforward function is configured to predict a converter output voltage that will cause the grid current to substantially equal a grid current associated with the grid current command signal.

14. A method in accordance with claim 11, wherein applying the filter that includes the non-linear portion comprises applying an integrator portion that includes the first voltage limit and the second voltage limit to the grid voltage feedback signal.

15. A method in accordance with claim 11, wherein filtering further comprises filtering the grid voltage feedback signal through a filter configured to output a voltage signal substantially equal to the linearly filtered value of the grid voltage signal when the output voltage signal is between the first voltage limit and the second voltage limit.

16. A method in accordance with claim 11, wherein filtering further comprises filtering the grid voltage feedback signal through a filter configured to generate an output signal that is within a predefined range of the grid voltage feedback signal when the output voltage signal is not between the first voltage limit and the second voltage limit.

* * * * *